(No Model.) 2 Sheets—Sheet 1.
B. G. CORSER.
Combined Rule and Scale.
No. 229,962. Patented July 13, 1880.
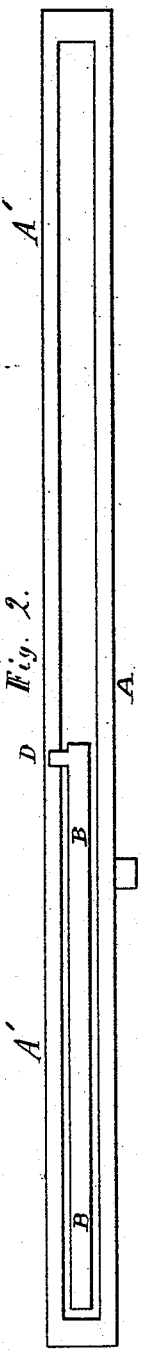
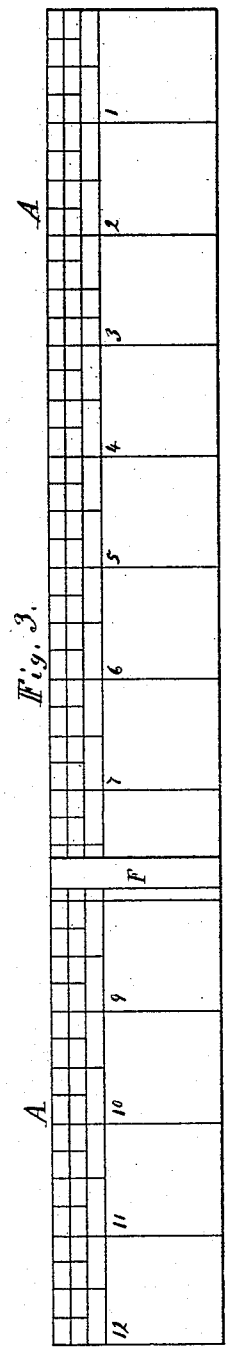
Witnesses;
S. H. Brackett.
M. A. Brackett
Inventor;
Brackett G. Corser (No Model.) 2 Sheets—Sheet 2.

B. G. CORSER.
Combined Rule and Scale.

No. 229,962. Patented July 13, 1880.

Witnesses;
S. H. Brackett.
M. A. Brackett

Inventor;
Brackett G. Corser

N. PETERS, PHOTO-LITHOGRAPHER, WASHINGTON, D. C.

UNITED STATES PATENT OFFICE.

BRACKETT G. CORSER, OF ST. JOHNSBURY, VERMONT, ASSIGNOR OF ONE-HALF OF HIS RIGHT TO L. C. SHEAR, OF SAME PLACE.

COMBINED RULE AND SCALE.

SPECIFICATION forming part of Letters Patent No. 229,962, dated July 13, 1880.

Application filed March 22, 1880. (No model.)

*To all whom it may concern:*

Be it known that I, BRACKETT G. CORSER, of St. Johnsbury, in the county of Caledonia and State of Vermont, have invented a new and useful Rule and Postal Scale Combined, of which the following is a specification.

The invention relates to improvements in postal scales, by which all letters, papers, merchandise, &c., to be transmitted through the mails can be more readily and more correctly prepared for such transmission, as proper facilities are afforded by my postal scale for determining the precise amount of postage to be affixed to all mailable matter. Thus the calculations usually necessary are avoided, and every one is enabled to assure himself at once that all matter deposited for mailing has been properly prepaid. I attain these objects by the mechanism illustrated in the accompanying drawings, in which—

Figure 4:
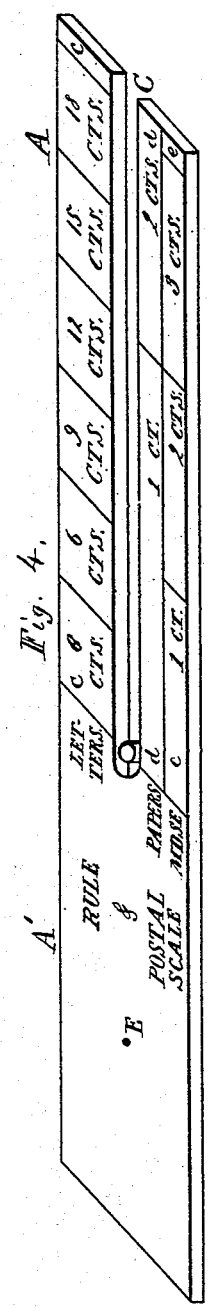
Figure 5:
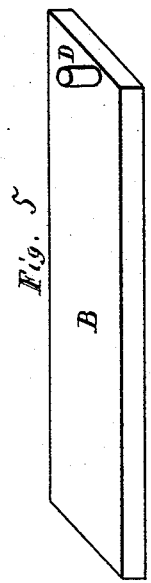
Figure 6:
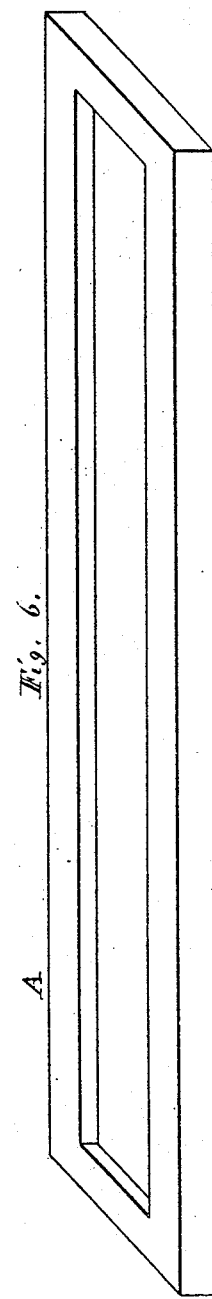
Figure 7:
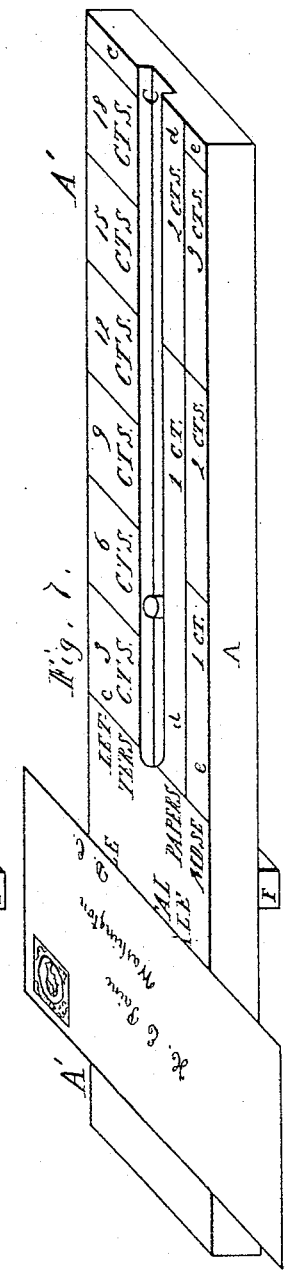

Figure 1 is a view of the combined rule and postal scale, upper side. Fig. 2 is a side view of a section of the same, the section being made through the middle perpendicularly lengthwise, and Fig. 3 is a view of the lower side of the same. Fig. 4 is a perspective view of the upper part as removed from the rest. Fig. 5 is a perspective view of the sliding weight or poise. Fig. 6 is a perspective view of the lower part, and Fig. 7 is a perspective view of the instrument in use for weighing a letter.

The whole apparatus in external appearance and general form resembles an ordinary rule, and may be used with perfect convenience for drawing lines and measuring length, like any ordinary rule. I make them of various sizes, from one to three feet or more in length; but a convenient size is three-eighths of an inch thick, one and a quarter inch wide, and fifteen inches long, more or less.

The rule A is made hollow, as seen in Figs. 2 and 6, in which it may be seen to resemble a shallow box with its lid A', Figs. 1 and 4, permanently fastened on when in use. In this box is laid a piece of heavy material, B, such as lead or iron, of such size as to slide freely in the central cavity. This forms the sliding poise or weight of the weighing-scale.

A little projection or knob, D, enters the slot C in the top of the rule or scale and serves as a means by which to move the weight B; but I do not commonly let this knob project above the surface of the scale, so that when the whole is used as a rule the knob may not be an inconvenience in this latter use.

On the lower side, or that side on which the instrument is to lie when used as a scale, there is a small projecting bar, F, extending at right angles to the longest dimension, and of about one-eighth of an inch in width and thickness. This bar serves as a fulcrum or pivot.

The weight of all of the parts is so adjusted that when the sliding weight is moved as far as possible toward the fulcrum and the whole laid down on a table or ordinary level surface it will exactly balance on the bar F. The breadth of this base F is such that the whole is in stable equilibrium for the time; but the bar is at the same time so narrow that a very slight force is sufficient to throw it off the balance.

At E, Figs. 1 and 4, a mark is made, on which the center of the object to be weighed is laid. When the object is laid on the rule the sliding weight, being moved toward the opposite end, a point is soon found where the equilibrium is restored and the object is accurately weighed. On the top, as seen in Fig. 1, there are scales of different kinds, so that one may see at a glance not the mere weight, but just what amount of postage is required.

The scale $c\ c$ is arranged for letters or all mailable matter of the first class, and is marked in multiples of three cents; and if the knob of the sliding weight rests, for instance, between the two marks between which are the words "Six cents," one knows that six cents postage are required.

The scale $d\ d$ is used for papers or matter of the third class, and the amount of postage is correctly indicated, as before. The scale $e\ e$ is similarly marked for merchandise or matter of the fourth class.

On the reverse or under side of the rule are put the usual scale of inches, (or of centimeters,) as seen in Fig. 3, so that it may be used in the same manner as an ordinary measuring-rule.

The sides and all outlines are made true, so may be used for drawing or ruling light lines.

I do not regard the exact place of these scales on the instrument as important, but should in some cases put them in different order, or may put some of them on the edge of the ruler. These scales may also be used in addition to the usual scale of figures denoting units of weight, such as ounces and pounds or grams. The shape of the whole instrument may also be varied, so that the end may be square—or, in other words, its thickness and width be the same; or it may be made of cylindrical shape, except that in the latter case the projection F must be made with a flat surface, as in the other cases. The central cavity may also be a round one, and made by boring, and the sliding weight would then be a round bar or a cylinder, the slot of the ruler and the projecting knob D of the bar being the same as before.

The weighing capacity of the scale is from one-sixteenth of an ounce to four pounds or more in the larger sizes.

The material of which the rule and scale is made is not essential, as it may be of wood, bone, ivory, vulcanite, celluloid, metal, or any other suitable material.

What I claim as new, and desire to secure by Letters Patent, is—

1. The hollow rule A, provided with the transverse fulcrum-bar F, in combination with the slotted cover A', provided with a postal scale indicating the amounts of postage to be paid on the matter weighed, and weight B, having projection D, substantially as described, and for the purpose set forth.

2. The hollow rule A, provided on its under side with a scale of inches or centimeters, and fulcrum-bar F, in combination with the weight B, having projection D, and the slotted cover A', provided on one side of its slot with a postal scale indicating the amount of postage to be paid on letters and on the opposite side of the slot with a similar postal scale for newspapers and merchandise, said cover having near its end opposite the slot a mark, E, to indicate where the center of the object to be weighed is to be laid, substantially as described, and for the purpose set forth.

BRACKETT G. CORSER.

Witnesses:
L. C. SHEAR,
S. H. BRACKETT.